Patented June 11, 1946

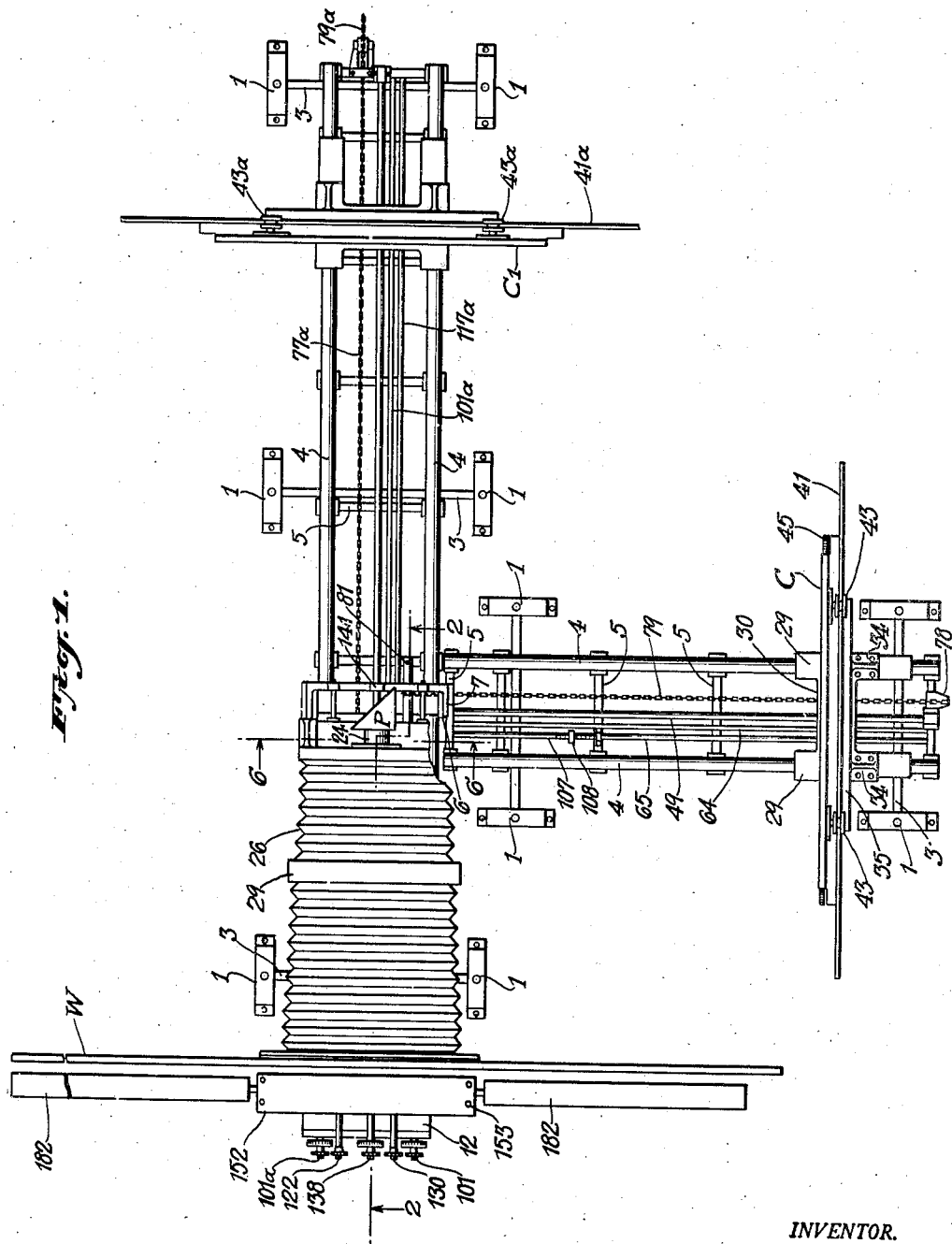

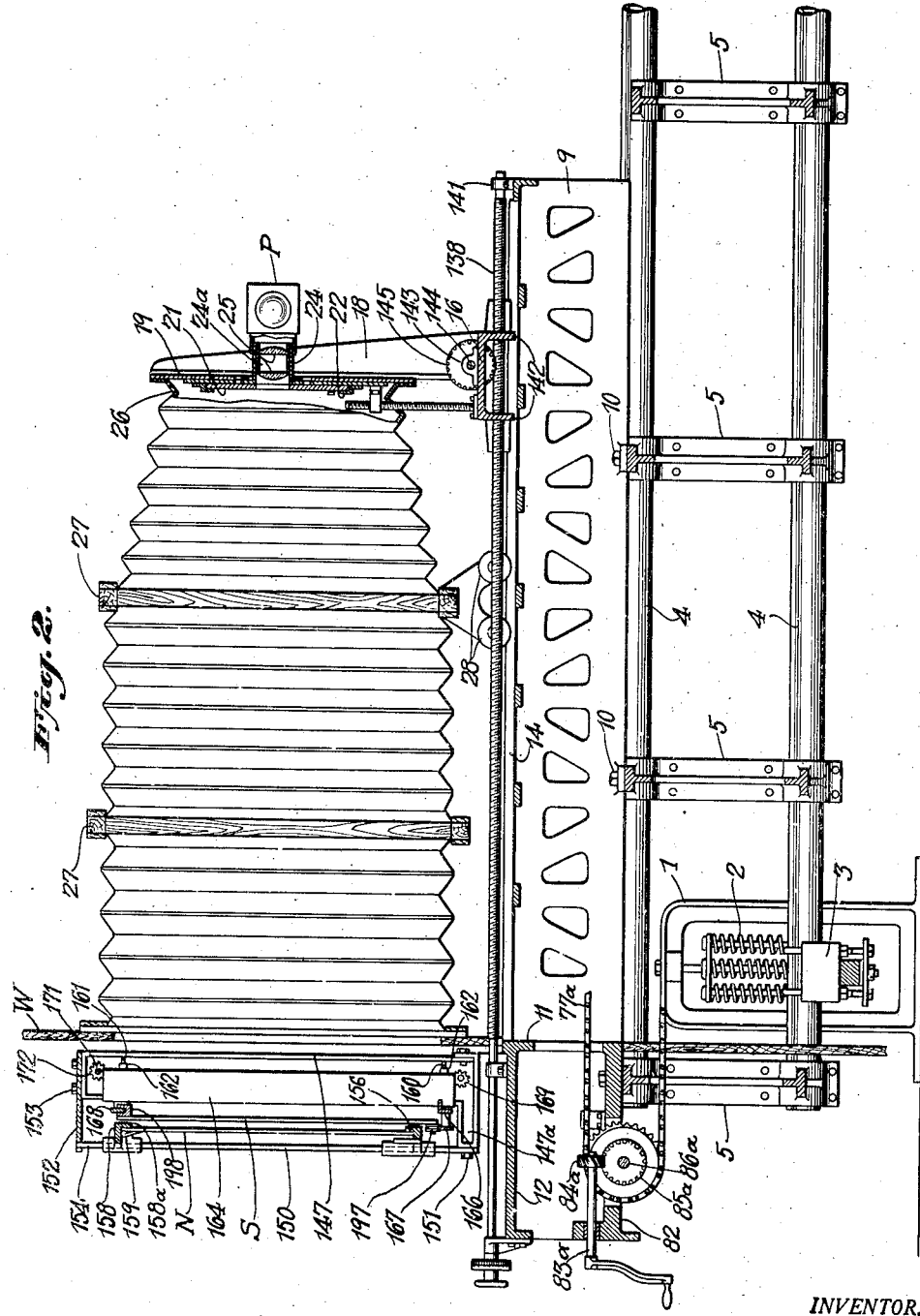

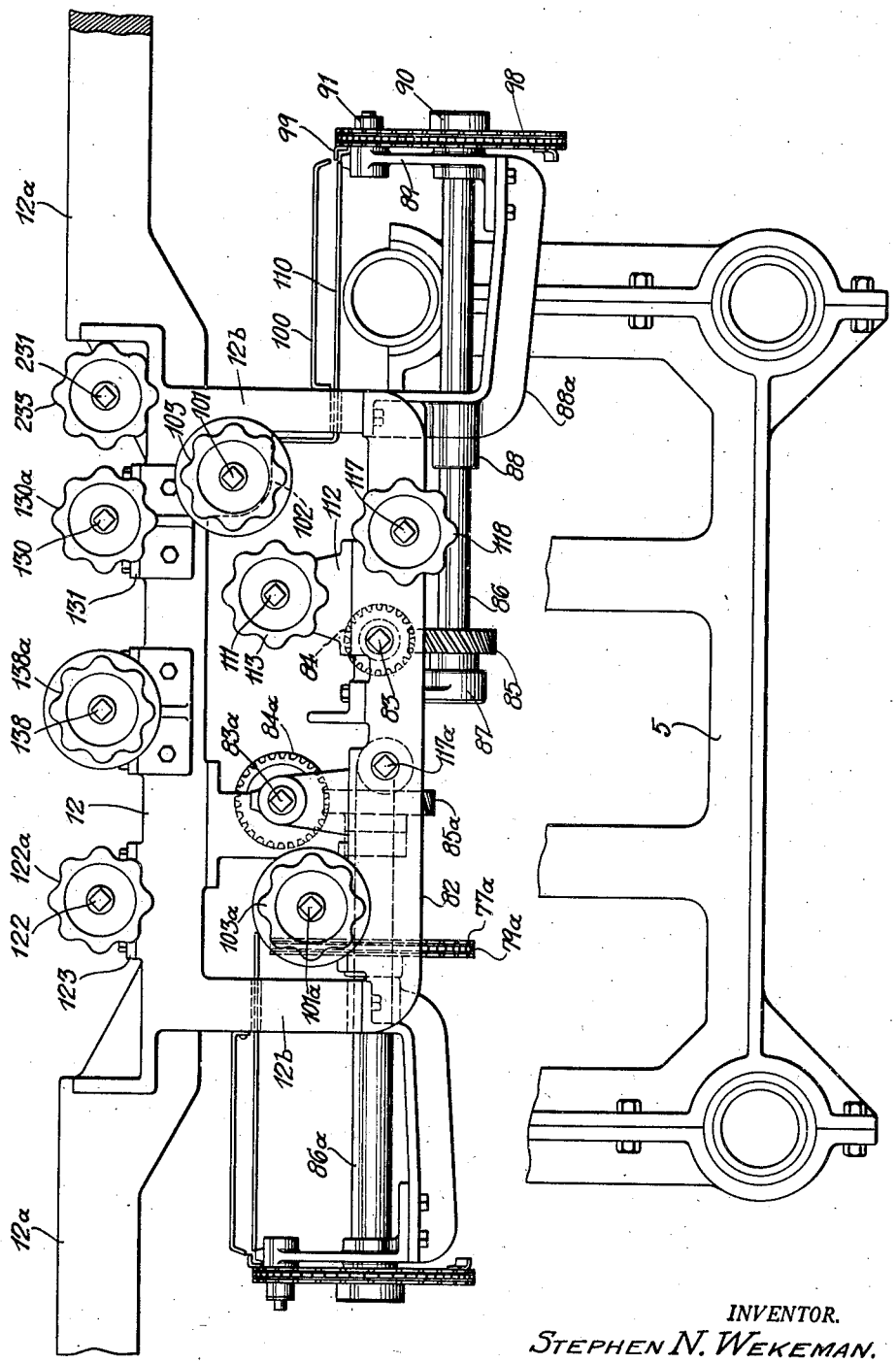

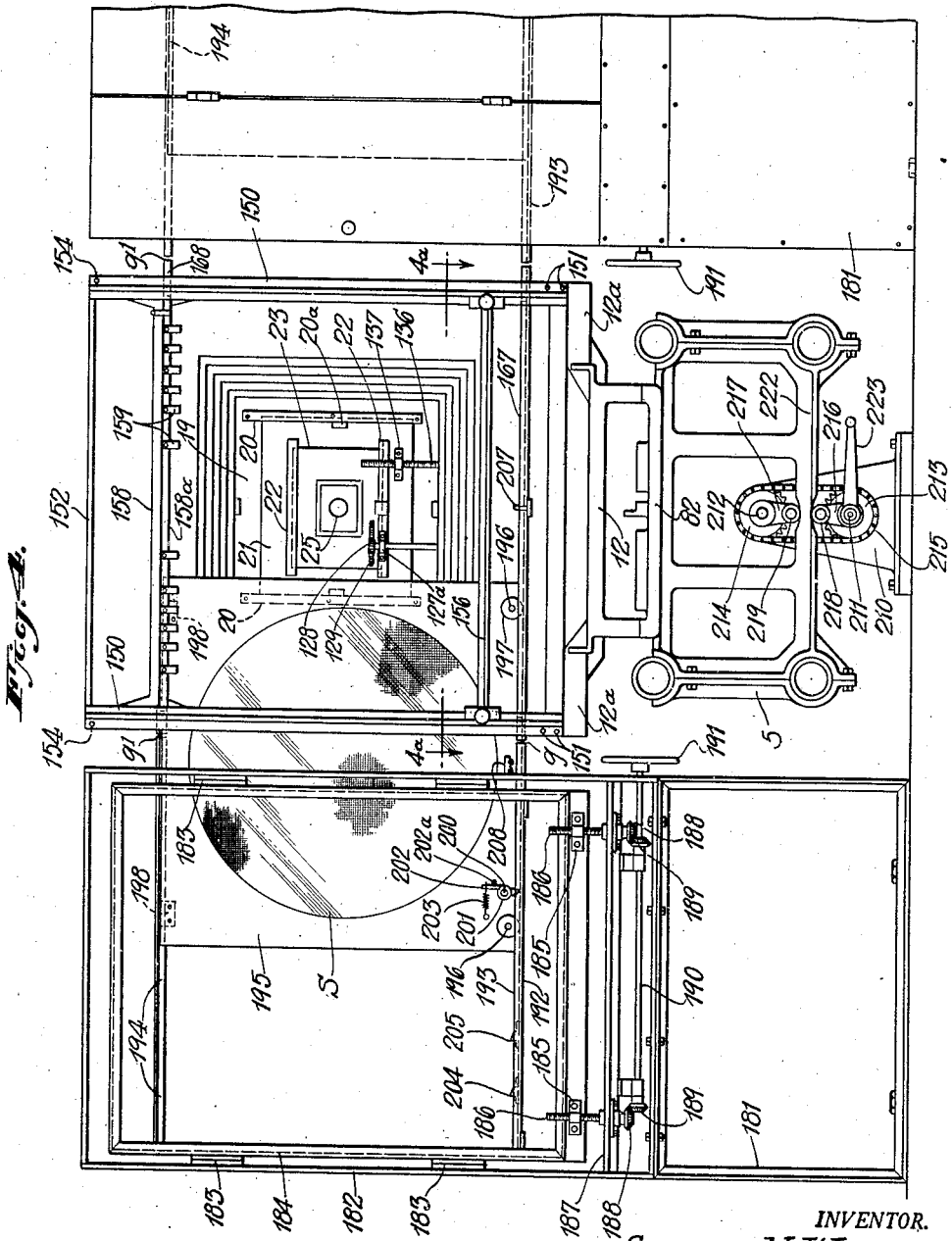

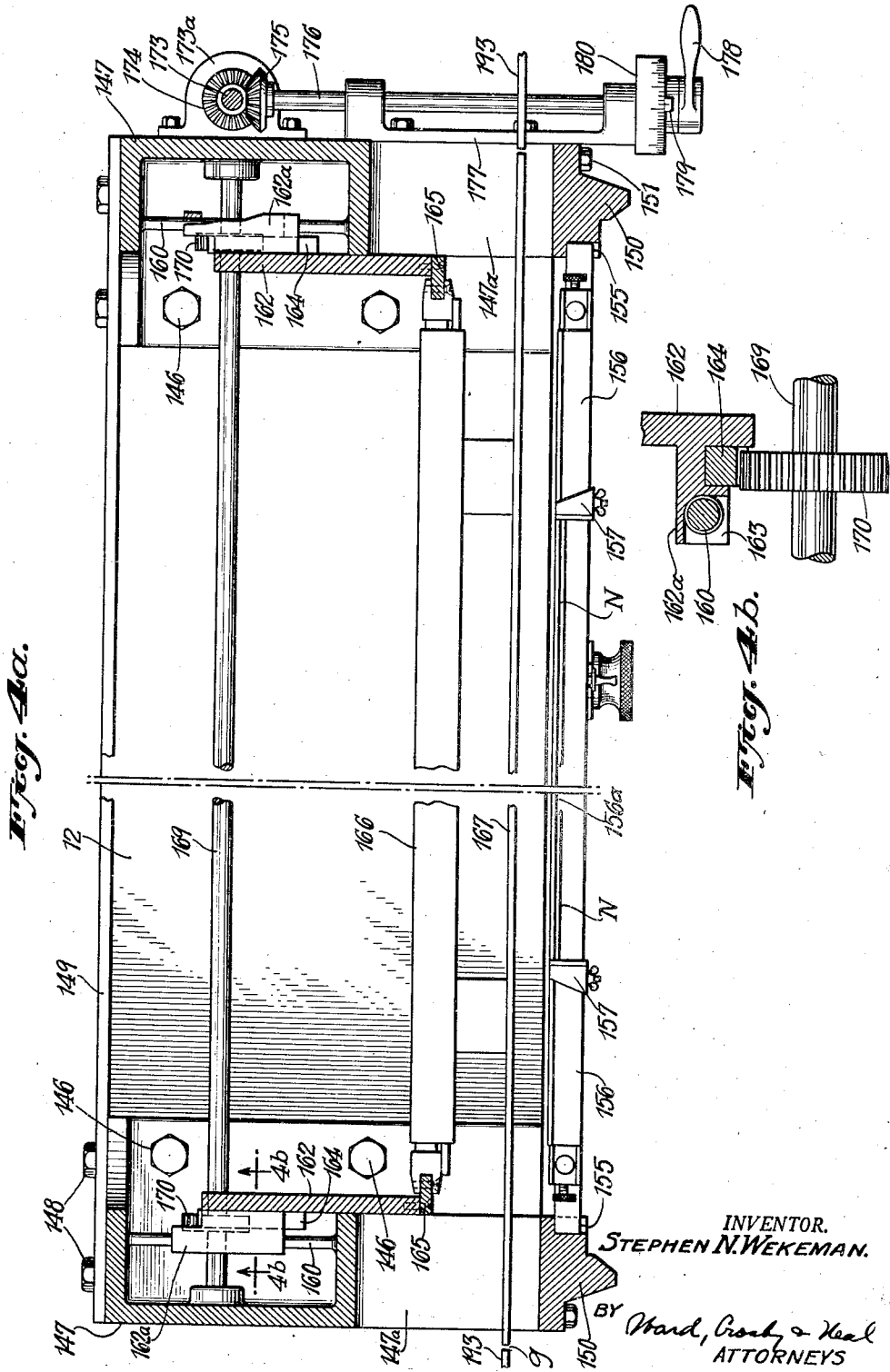

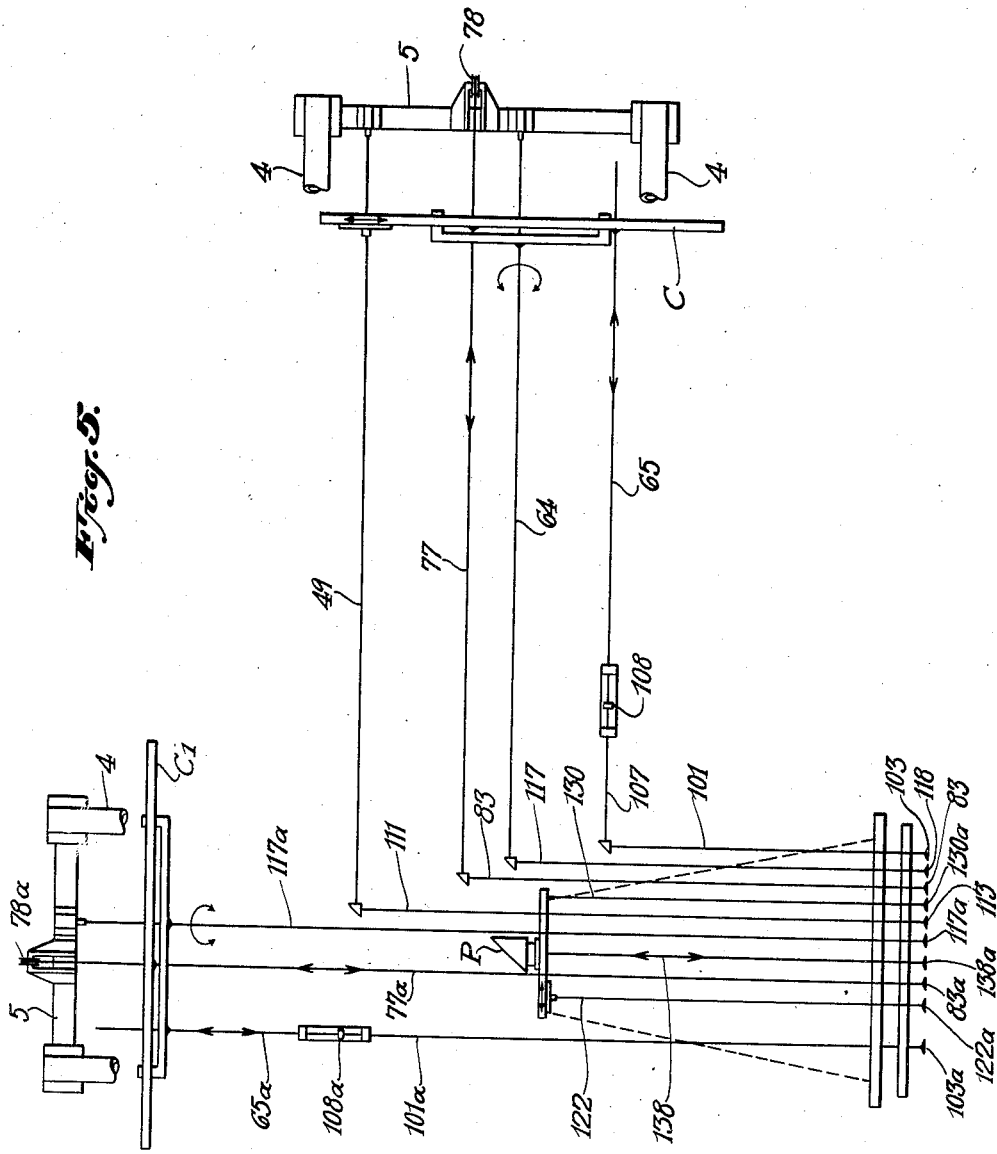

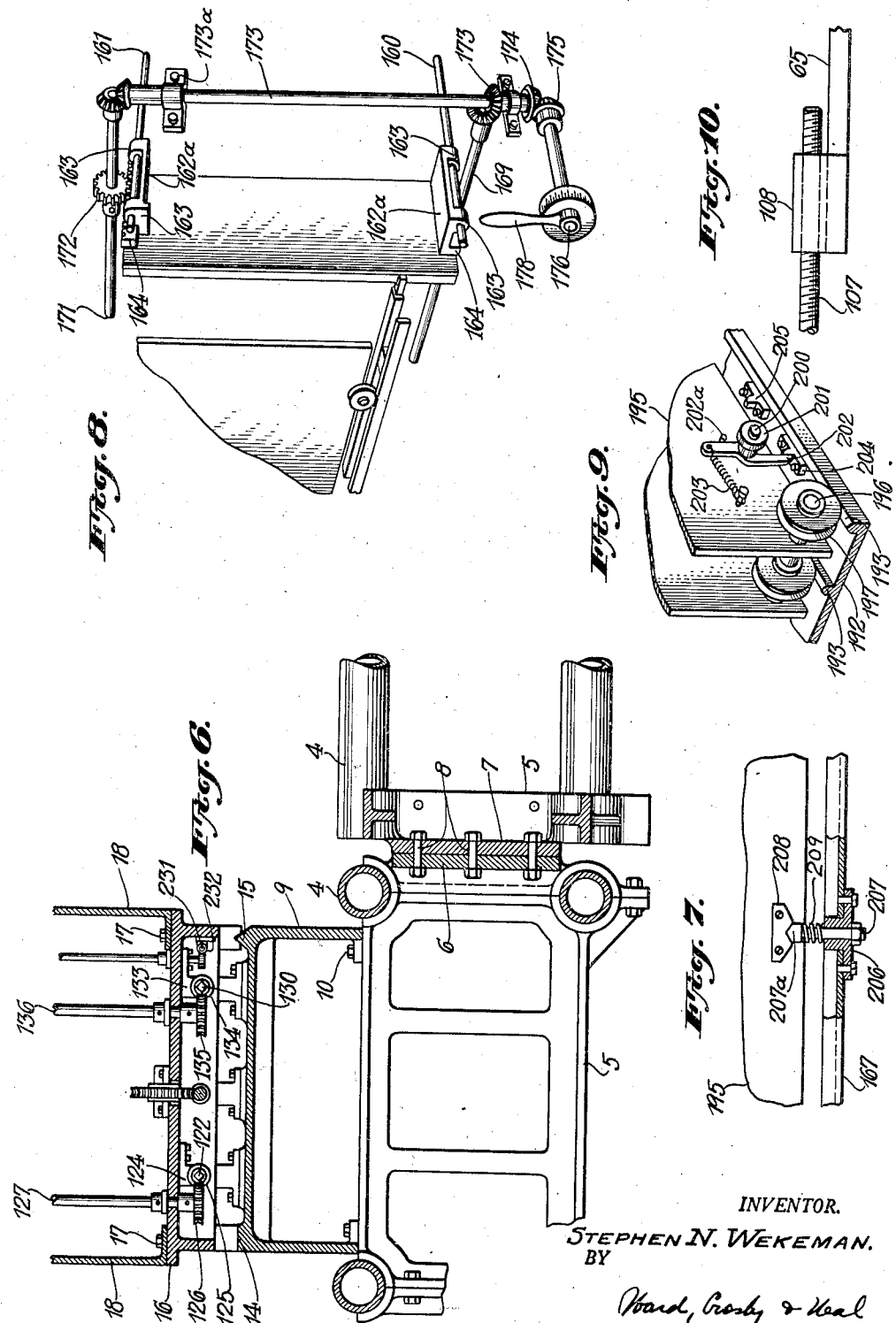

2,402,107

UNITED STATES PATENT OFFICE 2,402,107

CAMERA

Stephen N. Wekeman, Saddle River Township, Bergen County, N. J., assignor to Sun Chemical Corporation, a corporation of Delaware Original application July 27, 1940, Serial No. 347,858. Divided and this application July 17, 1942, Serial No. 451,266

8 Claims. (Cl. 88—24)

My invention relates to a camera adapted for efficient and satisfactory operation.

My invention has particular reference to a compartment or housing of novel construction and arrangement which is located in the dark room at one end of a camera for the storage of a camera plate element.

My invention has further reference to a prism camera comprising longitudinal and transverse frameworks, the longitudinal framework carrying a track which supports a plate element of optical character in projection position, means being provided for returning and holding said track in a horizontal position should it depart therefrom under the influence of the weight distribution on said frameworks.

My invention has further reference to a jack arrangement coactable with the longitudinal framework of a prism camera for causing a track supported thereby to assume and retain a horizontal position.

Various other objects, advantages and features of my invention will become apparent from the following detailed description.

My invention resides in the camera, features, arrangements and combinations of the character hereinafter described and claimed.

This application is a division of my prior application Serial No. 347,858, filed July 27, 1940.

For an understanding of my invention and for an illustration of one of the forms thereof, reference is to be had to the accompanying drawings, in which:

Figure 1 is a plan view showing a camera as constructed in accordance with my invention;

Fig. 2 is an enlarged longitudinal, vertical sectional view, partly in elevation, taken on the line 2—2 of Fig. 1 looking in the direction of the arrows;

Fig. 3 is an enlarged end elevational view showing the camera control mechanism;

Fig. 4 is an end elevational view showing various features of my novel camera as viewed from the dark room;

Fig. 4a is a horizontal sectional view, partly in plan, taken on the line 4a—4a of Fig. 4 looking in the direction of the arrows;

Fig. 4b is a horizontal sectional view, partly in elevation, taken on the line 4b—4b of Fig. 4a looking in the direction of the arrows;

Fig. 5 is a diagrammatic view showing the various controls;

Fig. 6 is a transverse sectional view, partly in elevation, taken on the line 6—6 of Fig. 1 looking in the direction of the arrows;

Fig. 7 is a fragmentary elevational view, partly in section, showing a screen-locking detent;

Fig. 8 is a perspective view showing actuating mechanism for the screen or compensating support;

Fig. 9 is a perspective view showing a safety latch arrangement; and

Fig. 10 is an elevational view showing a detail of the camera mechanism.

Referring to the drawings, the camera of my invention is shown as comprising a plurality of open frames 1 utilizable for supporting purposes, three of these frames 1 being alined longitudinally at each side of the camera and said frames 1 being alined in pairs transversely of the camera. Suspended from the top section of each frame 1 is a spring structure 2 and each pair of these transversely alined spring structures 2 carries a transverse member 3. These transverse members 3 support a longitudinally extending frame formed from four tubes or rods 4 so positioned that they form upper and lower pairs, all of said tubes 4 being disposed in parallel relation and the tubes 4 of the respective upper and lower pairs being horizontally alined. These tubes 4 are maintained in fixed frame-forming relation by transversely extending truss structures 5 disposed in parallel relation with respect to each other.

In accordance with my invention, the longitudinal framework defined by the above described tubes 4 has a transverse framework disposed at right angles with respect thereto. This transverse framework, the same as the longitudinal framework, comprises frames 1, spring structures corresponding with the aforesaid spring structures 2, transverse members corresponding with the aforesaid transverse members 3, tubes 4 and truss structures 5. Except for the fact that the transverse framework comprises but two pairs of the frames 1, the construction of both frameworks is of the same character and, therefore, the same reference characters have been applied to corresponding parts in each instance.

In accordance with the invention and as shown in Fig. 1, the transverse framework above described should be disposed exactly at right angles with respect to the longitudinal framework. Any suitable arrangement may be utilized for positively securing these frameworks in the relation just described and, as disclosed in Figs. 1 and 6, a pair of the transverse structures 5 near the center of the longitudinal framework have a plate section 6 formed integrally therewith, the outer surface of this plate section 6 being disposed in a vertical plane which is parallel with respect to the longitudinal axis of the longitudinal framework. The transverse tubes 4, at the ends thereof toward the left, Fig. 6, carry a transverse structure 5 which has a plate section 7 formed integrally therewith, the outer surface of this plate section 7 being disposed in a vertical plane which is at right angles to the longitudinal axis of the transverse framework. As shown in Fig. 6, the two plate sections 6 and 7 are positively secured together in face-to-face relation by bolts 8, or equivalent.

Referring to Figs. 2, 3 and 6, a plurality of the transverse structures 5 toward the left, Fig. 2, are shown as having a frame 9 secured thereto by bolts 10. This frame 9 is formed from upstanding walls disposed in parallel relation, these walls being joined at the top thereof by integral cross members. As shown particularly in Fig. 2, the frame 9, at the end thereof toward the left, comprises a transverse web member 11 beyond which, toward the left, extends a plate surface 12 utilizable as hereinafter described.

The above described upstanding walls of the frame 9, at their respective upper surfaces 14 and 15, form a pair of spaced tracks engaged by the respective bearing surfaces of a carriage 16 which has secured thereto by bolts or screws 17 a pair of standards 18 to which the lens frame 19 is bolted or secured in other equivalent manner, Fig. 2. Secured to the rear surface of the frame 19, Fig. 4, are a pair of spaced, vertical track members 20, 20 in which a plate 21 is vertically slidable. Secured to the rear surface of the plate 21 are a pair of spaced, horizontal track members 22, 22 in which a plate 23 is horizontally slidable. Secured to the front surface of the plate 23, Fig. 2, and projecting forwardly through alined openings in the plate 21 and frame 19 is a lens barrel 24 forming a support for the objective lens assembly 25. As is clearly shown in Figs. 1 and 2, the lens barrel 24 is adapted to detachably receive a sleeve 24a which forms a support for a prism P or other suitable light-reflecting member, said prism or said light-reflecting member being hereinafter generically referred to as a "prism." One axis of the prism P coincides with the longitudinal axis of the objective lens assembly 25 and the other axis of said prism P extends at right angles to said longitudinal axis in the direction of the transverse framework.

Suitably secured to the aforesaid frame 19 is the front end of a bellows 26 which, at its rear end, is suitably secured to a vertical wall W, Fig. 2, the area at the left thereof constituting the dark room for the herein disclosed camera. The bellows 26 has associated therewith the usual frames 27, one or both of which, on the respective lower surfaces thereof, carry a pair of transversely spaced wheel structures 28 coactable with the tracks 14 and 15, respectively.

Referring to Fig. 1, the carriage for the prism copy board C, i. e., the copy board mounted on the transverse framework, is shown as comprising a pair of channel members 29 supported by wheels, not shown, in inverted relation on the respective uppermost tubes 4 of said transverse framework, the members 29 being connected together by a plate member 30 formed, preferably, integrally therewith. Upstanding from and suitably secured to the respective channel members 29 are the vertical standards 34 disposed in alinement transversely of the transverse framework. Supported by the standards 34 transversely of the transverse framework is a frame 35 which, in the manner described in the aforesaid prior application, supports the copy board C, the latter, as shown, being disposed in a vertical plane.

As fully disclosed in said prior application, the copy board C is controlled for horizontal movement transversely of the transverse framework by a horizontal actuating member 49, Figs. 1 and 5, journalled in bearings upstanding from some of the transverse structures 5 of the transverse framework, the actuating member 49 being operated as hereinafter described. In order to impart pivotal movement to the copy board C, I provide a shaft 64 which extends longitudinally of the transverse framework and which is journalled in bearings formed in some of the transverse structures 5 thereof, said shaft 64 being operated as hereinafter described. As shown in Figs. 1 and 5, a square bar 65 is shown as supported by the transverse structures 5 of the transverse framework in such manner that it is incapable of moving longitudinally of said transverse framework. This bar 65, when actuated as hereinafter described, serves to move the copy board C longitudinally of the transverse framework at "slow" speed. In order to impart movement to the copy board C longitudinally of the transverse framework at "fast" speed, an endless sprocket chain 77 is suitably journalled and operated in the manner hereinafter described and for the purpose stated above.

The hereinbefore described plate surface 12 has the oppositely extending platforms 12a formed integrally therewith and, in addition, said plate surface 12 has depending side sections 12b likewise formed integrally therewith. As shown in Figs. 3 and 4, the side sections 12b have a horizontal supporting member 82 bolted or otherwise suitably secured thereto.

Referring to Figs. 3 and 5, a shaft 83 is shown as journalled in the supporting member 82, the shaft 83 extending longitudinally of the longitudinal framework and terminating, in driving relation, with the hereinbefore described sprocket chain 77. When the end of the shaft 83 in the dark room is rotated by a suitable handle or lever, rotary motion is applied thereto whereby the sprocket chain 77 extending longitudinally of the transverse framework becomes effective to impart "fast" motion to the plate member 30 and to the copy board C supported thereby. In this manner, the length of the light path between the hereinafter described negative and the copy board C is selected as desired, approximately.

Referring to Fig. 3, the shaft 83 is shown as having secured thereto a gear wheel 84 which meshes with a gear wheel 85 secured to and rotatable with a shaft 86 mounted in bearings 87 and 88 both carried by the supporting plate 82. The bearing 88 comprises a lateral section 88a to which is bolted an upright member 89 forming three bearings 90, 91 and another bearing, not shown. These bearings support shafts and sprocket wheels with which an endless sprocket chain 98 is coactable, the sprocket chain 98 carrying a pointer, not shown, which coacts with a scale, not shown, for indicating approximately the position to which the copy board C was moved as described above.

Referring to Fig. 3, a shaft 101 is shown as journalled in a bearing 102 carried by the plate surface 12, the shaft 101, at the end thereof in the dark room, having an actuating wheel 103 secured thereto. The shaft 101 extends longitudinally of the longitudinal framework and, by a gear wheel connection, not shown, is operatively connected to a shaft 107, Fig. 5, which extends longitudinally of the transverse framework and is supported by a bearing upstanding from one of the structures 5 of the transverse framework spaced from the longitudinal framework.

When the shaft 101 is rotated by the operator in the dark room, similar rotative movement is applied to the shaft 107. As shown in Fig. 10, rotative movement of the shaft 107 imparts "slow" movement, longitudinally of the transverse framework, to the member 108 carried by and movable with that end of the hereinbefore described bar 65 nearer the objective lens assembly 25.

As described in the aforesaid prior application, the bar 65 is non-operatively related to the copy board C while the sprocket chain 77 is actuated to impart "fast" movement to said copy board C longitudinally of the transverse framework. When slow movement is to be imparted to said copy board C, suitable means, not shown but described in the aforesaid prior application, is operated to connect said bar 65 to the copy board C so as to effect the desired "slow" movement thereof. Further, as described in said prior application, suitable indicating mechanism, not shown, may be associated with the shaft 101 in order to advise the operator concerning the position taken by the copy board C when the described "slow" movement is imparted thereto.

Referring to Fig. 3, a shaft 111 is shown as supported in a bearing 112 upstanding from the supporting member 82, the end of the shaft 111 in the dark room carrying an actuating wheel 113. The shaft 111 extends longitudinally of the longitudinal framework and, by a gear connection, not shown, is connected to that end of the hereinbefore described actuating member 49 which is nearer the objective lens assembly 25. When the operator in the dark room rotates the wheel 113, rotary movement is imparted to the shaft 111 and, this, in turn, is transmitted to the actuating member 49. As clearly disclosed in the aforesaid prior application, rotation of the actuating member 49 causes the copy board C to be moved horizontally in its vertical plane so as to center the copy on said copy board C in a desired position.

Referring to Fig. 3, a shaft 117 is shown as journalled in the supporting member 82, said shaft 117, at the end thereof in the dark room, carrying an actuating wheel 118. The shaft 117 extends longitudinally of the longitudinal framework and, by a gear connection, not shown, is connected to that end of the hereinbefore described shaft 64 which is nearer the objective lens 25. As will be understood, rotation of the shaft 117 transmits corresponding rotative movement to the shaft 64. As clearly disclosed in the aforesaid prior application, rotation of the shaft 64 serves to impart pivotal or oscillating movement to the copy board C, this being done whenever it becomes necessary to produce a parallel margin effect of the image on the negative with respect to a side of the negative or other reference line.

As shown in Fig. 1, the longitudinal framework has associated therewith a copy board C1 which is controlled, first, for "fast" and "slow" movement longitudinally of the longitudinal framework and, second, for pivotal or oscillatory movement in its plane by mechanism which is a duplicate of that hereinbefore described in connection with the copy board C with the exception, of course, that the operating means for the copy board C1 extends longitudinally of the longitudinal framework without any transverse extension thereof.

Accordingly, in view of the foregoing, the control mechanism for the copy board C1 will not be described in detail. However, to parts of the control mechanism for said copy board C1 which are identical with the corresponding parts of the control mechanism for the copy board C, the same reference characters have been used with the subscript $a$ added in each instance. In connection with the body board C1, it is to be noted that there is no movement thereof in a horizontal direction transversely of the longitudinal framework. As described, the copy board C may be moved in a horizontal direction transversely of its supporting framework.

In accordance with the foregoing and by reference to Fig. 3, the shafts $83a$, $101a$ and $117a$ effect, respectively, the "fast" motion of the copy board C1, its "slow" motion, and the tilting or pivotal motion thereof. It will be understood that the shafts $65a$ and $117a$ which extend longitudinally of the longitudinal framework for "slow" and tilting movement of the copy board C1 are supported by suitable bearings carried by some of the transverse structures 5 of the longitudinal framework. The sprocket chain $77a$ which is actuated to effect "fast" movement of the copy board C is supported at the far end of the longitudinal framework by a suitable sprocket wheel $78a$ and, adjacent the dark room, by a sprocket wheel $79a$ carried by the shaft $86a$ which is operated by the shaft $83a$.

As shown on the drawings, one end of a shaft 122 is indicated as journalled in a bearing breacket 123 carried by and upstanding from the plate surface 12, Fig. 3, the other end of said shaft 122 being supported by a bearing bracket 124 carried by the lower surface of the carriage 16, Fig. 6. The last named end of the shaft 122 has secured thereto a gear 125 which meshes with and drives a gear 126 carried by the lower end of a vertical shaft 127 journalled, at its lower end, in said carriage 16 and, at its upper end, in a bearing bracket 127a carried by the lower horizontal track 22, Fig. 4. The upper end of the shaft 127 has secured thereto a gear wheel 128 which meshes with a rack member 129 secured to the plate 23. When the hand wheel 122a, Fig. 3, carried by the first named end of the shaft 122 is rotated, the motion thereof is transmitted to the shaft 122 and from thence to the shaft 127. Rotation of the shaft 127 causes horizontal movement, Fig. 3, of the plate 23 and the objective lens assembly 25 carried thereby.

Referring to Fig. 3, one end of a shaft 130 is shown as journalled in a bearing bracket 131 upstanding from the plate surface 12, this end of said shaft 130 having an actuating wheel 130a secured thereto. The other end of the shaft 130 is supported by a bearing bracket 133 secured to the lower surface of the carriage 16 and said last named end of the shaft 130 has secured thereto a gear wheel 134 which meshes with and drives a gear wheel 135 secured to the lower end of a vertical shaft 136 journalled in said lower end in the carriage 16. As shown in Fig. 4, the upper threaded end of the shaft 136 extends through a nut member 137 secured to the plate 21. When the wheel 130a is rotated, the movement thereof is transmitted to the shaft 130 and from thence to the shaft 136, the threaded end of which coacts with the nut member 137 to move the plate 21, the thereby-carried plate 23 and the objective lens assembly 25 either upwardly or downwardly as the case may be.

As is well understood in the art, the objective lens assembly 25 is moved either horizontally or vertically in the manner described above whenever it becomes necessary to center the image of the copy on the copy board C1 with respect to a predetermined zone of the negative. The manner in which the described horizontal and vertical movements of the objective lens assembly 25 function in connection with the copy board C will be described subsequently.

Referring further to Fig. 3, one end of a shaft 138 is shown as journalled in a bracket 139 upstanding from the plate surface 12, said last named end of the shaft 138 having a hand wheel 138a secured thereto. As shown in Fig. 2, the other end of the shaft 138 is journalled in a bearing bracket 141 carried by the far end of the carriage 9. The shaft 138 is threaded throughout its length and coacts with threaded sections 142 of the carriage 16. When the wheel 138a is rotated, the resulting rotative movement of the shaft 138 effects movement either toward the right or the left, Fig. 2, of the carriage 16 and the thereby-carried objective lens assembly 25.

Referring further to Fig. 2, the carriage 16 is shown as carrying a bearing bracket 143 on which is journalled a horizontal shaft 144 carrying, at one end thereof, a gear wheel 145 which meshes with the aforesaid shaft 138. The shaft 144 extends horizontally through one of the standards 18 and, at its end, carries a hand wheel, not shown, by which movement of the carriage 16 in a desired direction may be effected by the operator while standing near the objective lens assembly.

As known in the art, the objective lens assembly 25 is moved longitudinally of the longitudinal framework in order to produce an image area on the negative of a desired size.

Referring to Figs. 1, 2, 4 and 4a, the hereinbefore described platforms 12a of the plate surface 12 have suitably secured thereto, as by the bolts 146, the respective standards 147 which are generally of channel-configuration with the channels disposed in facing relation. Suitably secured to the standards 147, as by the bolts 148, is a horizontal strap member 149. Disposed in front of the standards 147 are the respective vertical members 150 secured by bolts 151 to the respective forwardly extending sections 147a of the standards 147. As shown in Figs. 1, 2 and 4, a top plate 152 is secured by bolts 153 to the upper surfaces of the standards 147 and by bolts 154 to the upper surface of the vertical members 150.

The vertical members 150, on each inner surface thereof, are provided with a plurality of sets of horizontally alined notches 155 adapted, selectively, to receive the ends of a horizontal bar 156 which, as known in the art, comprises a seat 156a in which the lower end of a negative plate N is seated, the sides of said negative N being adapted for engagement by members 157 which are slidable on the bar 156.

An upper horizontal bar 158, Fig. 4, is carried by the vertical members 150 in an adjustable manner as known in the art. This bar 158 has a horizontal surface 158a forming a seat for the upper surface of the aforesaid negative N which is detachably held in its seat by the known pivoted arrangement comprising the horizontal row of fingers 159 which are supported by said bar 158 for pivotal movement as a unit.

In lieu of the aforesaid negative plate N, it will be understood that a translucent focusing plate may be seated in the manner described on the seat provided for said plate N.

As shown in Figs. 4a and 8, each of the standards 147 carries a lower member 160 and an upper member 161, these members extending longitudinally with respect to the longitudinal framework and being vertically and horizontally alined. A vertical plate member 162 is disposed immediately adjacent each vertical set of lower and upper members 160 and 161. At each of its lower and upper ends, the plate member 162 terminates in an extension 162a, Fig. 8, having the bearing collars 163 formed integrally therewith, the lower bearing collars 163 being slidable on the lower member 160 and the upper bearing collars 163 being slidable on the upper member 161. Each extension 162a has a horizontal rack member 164 secured thereto, each pair of the rack members 164 being disposed in vertical alinement and utilizable as hereinafter described.

Each of the plates 162, at its front surface, has secured thereto a laterally extending bar 165, the bars 165 corresponding in height substantially with that of the respective plates 162. As shown in Figs. 2 and 4a, the bars 165, adjacent their lower ends, have suitably secured thereto a horizontal extending member 166 to which, forwardly thereof and spaced therefrom by blocks, a lower track 167 is fixed. The bars 165, adjacent their upper surfaces, have secured thereto an upper horizontal track member 168, utilizable as hereinafter described.

Referring to Figs. 4a and 8, a horizontal shaft 169 is shown as journalled in the standards 147 adjacent the bottom thereof. The shaft 169 has secured thereto a pair of spaced gear wheels 170 which mesh with the respective lower rack members 164. A second horizontal shaft 171 is journalled in the standards 147 adjacent the top thereof and, in correspondence with the construction just described, the upper shaft 171 carries a pair of spaced gear wheels 172 which mesh with the respective upper rack members 164. The shafts 169 and 171 extend outwardly through that standard 147 toward the right, Fig. 4a, where they are suitably geared to a vertical shaft 173 having bearings in brackets 173a projecting from said last named standard 147. The shaft 173, at its lower end, carries a bevel gear 174 with which coacts a bevel gear 175 secured to one end of a shaft 176 supported by bearings formed in a bracket 177 supported by said last named standard 147. The end of the shaft 176 opposite the bevel gear 175 carries an actuating handle 178 having a hub which carries a pointer 179 coactable with an index drum 180 secured to said bracket 177.

The carriage arrangement comprising the track 167 and track 168 is well known in the art and, as hereinafter described, this carriage arrangement serves as a support either for a screen or a compensating glass. When the parts are positioned as shown in Fig. 4a, the handle 178 may be rotated in the proper direction to effect rearward movement (toward the objective lens assembly 25) of the rack members 164. As described, the plates 162 are secured to said rack members and, therefore, partake of movement therewith. The plates 162 form the supports for the track 167 and track 168. Therefore, rotation of the handle 178 as described effects movement of said carriage arrangement and the optical element carried thereby.

Referring to Fig. 4, a frame support 181 is shown as suitably secured to a floor or other supporting surface. Carried by and bolted to the frame support 181 is a box 182 to the respective vertical sides of which vertical guide members 183 are secured. Slidably carried by the guide members 183 is a screen rack 184 which comprises upper and lower horizontal sides joined by oppositely disposed vertical sides. The lower horizontal side of the rack 184 carries a pair of spaced nut members 185 with which coact, respectively, the vertical screws 186 journalled in a plate 187 horizontally fixed in the box 182 adjacent the bottom thereof. The lower ends of the screws 186, respectively, carry bevel gears 188 with which coact the respective bevel gears 189 secured to a shaft 190 journalled in bearings depending from said horizontal member 187, the shaft 190 extending through that wall of the box 182 toward the right, Fig. 4, and there having a hand wheel 191 secured thereto.

Referring to Figs. 4 and 9, the rack 184 is shown as having secured thereto a lower horizontal member 192 which comprises one or more upwardly extending tracks 193. In addition, the rack 184 has secured thereto an upper horizontal member which comprises one or more downwardly facing tracks 194 disposed vertically above the respective tracks 193.

As shown in Fig. 4, the screen which is to be disposed within the rack 184 comprises the glass sheet S which is carried by a metallic frame 195 having, immediately adjacent the lower surface thereof, a pair of horizontally alined stud members 196 on which are mounted the respective wheels 197 adapted to engage one of the tracks 193, Fig. 9. The frame 195, immediately adjacent the upper surface thereof, carries a pair of vertically adjustable blocks 198 each having an upwardly facing groove into which extends the upper track 194 which is disposed vertically above said last named track 193.

Referring to Figs. 4 and 9, the screen frame 195, adjacent one lower corner thereof, has journalled therein a horizontal shaft member 200 carrying an operating knob 201 at one end thereof. Secured to the shaft member 200 for oscillatory movement therewith is a pawl 202 which, by a suitably anchored spring 203, is biased in a counter-clockwise direction, Fig. 9, the upper end of the pawl 202 being adapted to engage a stop member 202a. The lower end of the pawl 202 is coactable with a pair of latching members 204 and 205 mounted in spaced predetermined relation, as hereinafter described, on the upper surface of the hereinbefore described member 192.

As shown in Figs. 4 and 7, the hereinbefore described track 167, midway between the facing surfaces of the members 150, Fig. 4a, has secured thereto a bearing member 206 having extending therethrough a vertical passage in which a pin 207 is slidably mounted. At its top, the pin 207 is wedge-shaped as indicated at 207a so as to be readily coactable, in latching relation, with a recess formed in a member 208 carried by the screen frame 195 midway between the vertical sides thereof. A helical spring 209 is disposed around the pin 207 and confined between the bearing member 206 and the enlarged section 207a of the pin 207 whereby the latter is biased upwardly, Fig. 7.

Referring further to Fig. 4, an arrangement is indicated at the right thereof for housing a compensating glass, not shown. This housing for the compensating glass is a duplicate of that described above for housing, supporting and moving the screen S. Hence, further description of the housing for the compensating glass will be omitted and duplicate parts of the two arrangements will have the same reference characters applied thereto.

Referring to Fig. 4, a fixed standard 210 is shown as upstanding from and fixed to the hereinbefore described floor or other supporting surface. Journalled in the standard 210 are a pair of spaced, horizontal shafts 211 and 212 disposed in vertical alinement. Secured to and rotatable with the shafts 211 and 212 are the respective sprocket wheels 213 and 214 with which an endless sprocket chain 215 is coactable. In addition, the shafts 211 and 212 have the respective arms 216 and 217 fixed thereto and rotatable therewith. Carried by the free ends of the arms 216 and 217 are the respective rollers 218 and 219 adapted to engage, respectively, with the upper and lower arcuate surfaces formed on the lower section 222 of that truss structure 5 shown in Fig. 4, the truss structure 5 last named being the one shown at the extreme left, Fig. 2. The arrangement described immediately above constitutes a "jack" and it is operated, in the manner hereinafter described, by a handle 223 secured to and rotatable with the lower shaft 211, Fig. 4.

As hereinbefore pointed out, spring structures 2 are incorporated in the supporting arrangements for the longitudinal and transverse frameworks. During use of the camera, all of these spring structures 2 should be operative and this condition exists when the jack shown in Fig. 4 is in its non-operative position. In said Fig. 4, the jack is shown in operative position. To render the same non-operative, the handle 223 is rotated counter-clockwise to thereby produce similar movement of the arm 216 together with its roller 218 and clockwise movement of the arm 217 together with its roller 219. As a result, the rollers 218, 219 are freed from restraining effect on the truss section 222.

As stated above, the jack should be in its non-operative position during normal operation of the camera. However, during a dark room enlarging operation, the jack should be in its operative position wherein it nullifies the effect of the spring structures 2. As a result, the vibration of the camera and the vibration of the enlarging back will be substantially the same, this condition being desired.

In addition to the foregoing, the jack herein disclosed is of decided advantage when shifting the screen or the compensating glass either toward or from the projection position, i. e., that position in the field of the objective lens assembly 25. When the jack is non-operative, the tracks 167 and 168 (which support either the screen S or the compensating glass in the projection position), usually, will depart slightly from a horizontal position, this depending on the distribution of weight on the two frameworks which is governed largely by the position of the copy board C. Under such conditions, if the jack is placed in its operative position as shown in Fig. 4, the truss section 222 is caused to take a horizontal position and, as a result, the tracks 167 and 168 likewise take a horizontal position. When said tracks 167 and 168 are thus positioned horizontally, either the screen S or the compensating glass may be moved into operative position with respect thereto.

Assuming that the tracks 167 and 168 have been moved to horizontal position as described above, the operator, by movement of the handle 178, shifts the movable supporting structure therefor so as to bring the tracks 167 and 168 into the plane of those respective tracks 193 and 194 supporting that screen S which is to be moved into projecting position. Thereupon, by actuation of that hand wheel 191 at the left, Fig. 4, the rack 184, by the described mechanical arrangement, is either raised or lowered as may be required in order to bring said last named track 193 into horizontal alinement with the track 167 and, similarly, to bring the upper track 194 into horizontal alinement with the track 168. When this has been done, there is a short gap g between said last named track 193 and the track 167 and a similar gap g1 between the track 194 and the track 168, Fig. 4. At this time, the screen S may be moved from left to right, Fig. 4, into the projecting position from its supporting rack 184.

As clearly appears from Fig. 9, the latching member 204 cooperates with the pawl 202 to positively retain the screen S in its normal position within the rack 184. When the screen is to be moved to the projection position, the operator moves the screen and its frame 195 slightly toward the left, Fig. 9, while rotating the knob 201 and pawl 202 in a counter-clockwise direction, Fig. 9. By so doing, the pawl 202 is disengaged from the latching member 204 whereupon the screen and its frame 195 may be moved toward the right, Fig. 9, until the pawl 202 engages the latching member 205. In this position, the forward edge of the screen S has nearly reached the gaps g and g1. Accordingly, the operator has a last chance to ascertain if the upper and lower guiding tracks 167, 193 and 168, 194 are horizontally alined. If so, by an action the same as described above, the pawl 202 is disengaged from the latching member 205 and the screen S is then moved into the projection position where it becomes locked by automatic action of the pin 207 on the member 208, the pawl 202 becoming disengaged from the latching member 205 at this time.

After the screen S has been moved into the projection position as described above, the jack is rendered non-operative whereupon the negative N may be seated in the manner hereinbefore described and the projection operation proceeded with.

In view of the foregoing description, it will be understood that the screen S, by an operation the reverse of that described above, may be moved from its projecting position back into the rack 184. It will also be understood that, by operations of the character described, a compensating glass may be removed from its supporting rack at the right of Fig. 4, moved into projection position and returned to its supporting rack when desired.

If an ordinary negative is to be produced, the operator places the copy on the copy board C1 and a ground glass is seated on the bars 156 and 158, Fig. 2, the prism P being removed from the lens barrel 24 at this time and, usually, the compensating glass being in the projection position. Thereupon, the wheel 138a, the shaft 83a and wheel 103a are adjusted to move the objective lens assembly 25 and the copy board C1 longitudinally with respect to the longitudinal framework whereby the projected image takes a desired size and becomes properly focused on the ground glass. Thereafter, as required, the wheels 122a and 138a are adjusted to effect horizontal and vertical movement of the objective lens assembly 25, the shaft 117a also being adjusted at this time to effect oscillatory or tilting movement of the copy board C1 in its plane. The adjustments last noted serve to move the projected image laterally in its image plane as required.

When the foregoing has been completed, the ground glass is removed, a negative plate substituted therefor, the mating screen S substituted in the projection position for the aforesaid compensating glass and, after the copy has been properly illuminated, the shutter mechanism, not shown, for the objective lens assembly 25 is operated to thereby cause the projecting light beam to pass from the copy on the copy board C1, through said objective lens assembly 25 and thence to the negative N.

If a reversed negative is to be produced, the prism P is associated with the lens barrel 24 as shown in Fig. 2 and the copy is placed on the copy board C. After the ground glass has been seated on the bars 156, 158, Fig. 2, and the compensating glass placed in projecting position, the wheel 122a is operated to move the plate 23, Fig. 4, into engagement with a stop member 20a, for example. Thereafter, during the operation of producing the reversed negative, no horizontal movement of the objective lens assembly 25 is effected. It will be understood that, in lieu of the stop member 20a, any other suitable arrangement, such as scale marks placed, respectively, on the upper part of the plate member 23 and the upper track member 22, may be utilized for locating the objective lens assembly 25 in a predetermined position.

After the foregoing has been completed, the wheel 138a, the shaft 83 and the wheel 103 are adjusted to move the objective lens assembly longitudinally of the longitudinal framework and the copy board C longitudinally of the transverse framework whereby the projected image is caused to take a desired size and to become properly focused, the wheels 130 and 113, Fig. 3, being adjusted at this time to effect such vertical movement of the objective lens assembly 25 and such horizontal movement of the copy board C as may be necessary, the wheel 117 also being adjusted at this time, if necessary, to effect oscillatory or tilting movement of the copy board C in its plane.

A feature of the invention relates to the movement of the copy board C horizontally in its plane under the control of the wheel 113. This is necessary by reason of the fact that the objective lens assembly 25 and prism P, necessarily, are moved longitudinally of the longitudinal framework during the focusing operation, and corresponding movement, necessarily, is imparted to the copy board C in order for the image to be properly placed on the negative plate in the dark room.

In lieu of a ground glass as described above, it will be understood that the various adjustments may be effected by use of dials and scales as well known in the camera art provided that data is at hand relating to a previous projecting operation of the particular copy in use.

Although the invention hereinbefore described relates principally to a prism camera, it is to be understood that there are certain features which are not to be limited to a camera of the character last stated. Thus, for example, the jack illustrated in Fig. 4, the mechanism for supporting and elevating either a screen or a compensating glass, the track-alining arrangement shown in Fig. 4, etc., are of general application and are not to be limited to use with a prism camera.

In Fig. 4, I have illustrated an arrangement wherein the screen S is mounted in a rack at one side of the camera and the compensating glass in a rack at the other side of the camera. It shall be understood that the invention is not to be thus limited because, if desired, a rack may be provided at one side only of the camera, such rack containing a screen S and its mating compensating glass. Further, it is to be understood that, if desired, the rack or racks may be supported directly on the camera frame in which case the frame supports 181 would be omitted.

It shall be understood that the invention herein described is not to be limited to longitudinal and transverse frameworks of the particular character illustrated. As well, said frameworks may be of other equivalent character and they may be supported otherwise than by a floor or other surface from which they rise vertically.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a storage arrangement for a plate element of optical character, a rack, means for moving said rack in a vertical direction, and upper and lower horizontal tracks disposed in said rack for supporting said plate element for movement in a horizontal direction, said tracks projecting through and beyond one vertical side of said rack.

2. In a storage arrangement for a plate element of optical character, a rack, means for moving said rack in a vertical direction, upper and lower horizontal tracks disposed in said rack for supporting said plate element for movement in a horizontal direction, said tracks projecting through and beyond one vertical side of said rack, and means for releasably retaining said plate element in a plurality of horizontal positions.

3. A camera having a framework adapted to assume a non-horizontal position, a track carried by said framework for supporting a plate element of optical character in projection position, said track assuming a non-horizontal position in correspondence with the non-horizontal position of said framework, a horizontal track at one side of said projection position for supporting said plate element, means for adjusting said horizontal track in a vertical direction, and means for temporarily holding said framework and the track carried thereby in a horizontal position.

4. The combination with a framework having a member adapted to assume a non-horizontal position, of a jack for temporarily holding said framework in a horizontal position, said jack comprising arms adapted to engage the respective upper and lower surfaces of said member in clamping relation, and means for releasing said arms from said member, said means comprising sprocket wheels mounted on the respective axes of said arms, an endless sprocket chain coacting with said sprocket wheels, and a handle for actuating said sprocket chain.

5. In a storage arrangement for plate elements of optical character, a rack, a plurality of lower horizontal tracks disposed parallel with each other in said rack for supporting the respective plate elements, a framework, a lower horizontal track carried by said framework for supporting said plate elements individually, and means for effecting relative movement between said rack and said framework to aline said last named track with either of said first named tracks.

6. In a storage arrangement for plate elements of optical character, a rack, a plurality of lower horizontal tracks disposed parallel with each other in said rack for supporting the respective plate elements, a framework, a lower horizontal track carried by said framework for supporting said plate elements individually, and means for moving said framework to different positions to aline said last named track with either of said first named tracks.

7. In a storage arrangement for plate elements of optical character, a rack, a plurality of lower horizontal tracks disposed parallel with each other in said rack for supporting the respective plate elements, a framework adapted to assume a non-horizontal position, a lower horizontal track carried by said framework for supporting said plate elements individually, means for moving said framework to different positions to aline said last named track with either of said first named tracks, and means for temporarily holding said framework and the track carried thereby in a horizontal position to aline the framework track with one of said other tracks whereby a plate element may be moved thereon in either of opposite directions.

8. In a storage arrangement for a plate element of optical character, a rack, upper and lower horizontal tracks disposed in said rack for supporting said plate element for movement in a horizonal direction, a plurality of latching members spaced along one of said tracks, and a pawl carried by said plate element for coaction with said latching members individually, said pawl coacting with one of said latching members to releasably retain said plate element in its storage position, said pawl coacting with another of said latching members to releasably retain said plate element in a position wherein the forward edge thereof is closely adjacent the ends of said tracks.

STEPHEN N. WEKEMAN.